(12) United States Patent
Crump et al.

(10) Patent No.: US 8,245,757 B2
(45) Date of Patent: Aug. 21, 2012

(54) INORGANIC IONIC SUPPORT MATERIALS FOR DIGITAL MANUFACTURING SYSTEMS

(75) Inventors: S. Scott Crump, Wayzata, MN (US); J. Samuel Batchelder, Somers, NY (US); Timothy Sampson, Bloomington, MN (US); John Barnett, Bloomington, MN (US)

(73) Assignee: Stratasys, Inc., Eden Prairie, MN (US)

( * ) Notice: Subject to any disclaimer, the term of this patent is extended or adjusted under 35 U.S.C. 154(b) by 73 days.

(21) Appl. No.: 12/698,528

(22) Filed: Feb. 2, 2010

(65) Prior Publication Data

US 2010/0193998 A1    Aug. 5, 2010

Related U.S. Application Data

(60) Provisional application No. 61/149,182, filed on Feb. 2, 2009.

(51) Int. Cl.
  *B22C 9/08*    (2006.01)
  *B29C 41/02*   (2006.01)

(52) U.S. Cl. ...................................... 164/15; 106/286.7

(58) Field of Classification Search ............... 106/286.6, 106/286.7; 164/15
See application file for complete search history.

(56) References Cited

U.S. PATENT DOCUMENTS

| | | |
|---|---|---|
| 556,472 A | 3/1896 | McCarroll |
| 1,533,309 A | 4/1925 | Durborow |
| 4,749,347 A | 6/1988 | Valavaara |
| 5,109,589 A | 5/1992 | Cramer et al. |
| 5,121,329 A | 6/1992 | Crump |
| 5,141,680 A | 8/1992 | Almquist et al. |
| 5,303,141 A | 4/1994 | Batchelder et al. |
| 5,312,224 A | 5/1994 | Batchelder et al. |
| 5,340,433 A | 8/1994 | Crump |
| 5,342,664 A | 8/1994 | Drotloff et al. |
| 5,406,969 A | 4/1995 | Gray et al. |
| 5,503,785 A | 4/1996 | Crump et al. |
| 5,572,431 A | 11/1996 | Brown et al. |
| 5,622,216 A | 4/1997 | Brown |
| 5,656,230 A | 8/1997 | Khoshevis |
| 5,764,521 A | 6/1998 | Batchelder et al. |
| 5,816,466 A | 10/1998 | Seufer |
| 5,866,058 A | 2/1999 | Batchelder et al. |

(Continued)

FOREIGN PATENT DOCUMENTS

WO   WO 9937454    7/1999

(Continued)

OTHER PUBLICATIONS

AMS International, "Introduction to Aluminum-Silicon Casting Alloys", (10 pages), vol. 1; Aluminum-Silicon Casting Alloys: Atlas of Microfractographs; Materials Park, Ohio, USA, Published 2004.

(Continued)

*Primary Examiner* — Yogendra Gupta
*Assistant Examiner* — Alison Hindenlang
(74) *Attorney, Agent, or Firm* — Brian R. Morrison; Westman, Champlin & Kelly, P.A.

(57) ABSTRACT

A support material for use with a digital manufacturing system, the support material comprising at least one inorganic ionic compound and is configured to be deposited with the digital manufacturing system using a layer-based additive technique to form a support structure for supporting at least one overhanging region of a three-dimensional model built with the digital manufacturing system.

20 Claims, 4 Drawing Sheets

U.S. PATENT DOCUMENTS

| | | |
|---|---|---|
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,027,326 A | 2/2000 | Cesarano, III et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,214,279 B1 | 4/2001 | Yang et al. |
| 6,228,923 B1 | 5/2001 | Lombardi et al. |
| 6,238,613 B1 | 5/2001 | Batchelder et al. |
| 6,257,517 B1 | 7/2001 | Babish et al. |
| 6,437,034 B2 | 8/2002 | Lombardi et al. |
| 6,547,995 B1 | 4/2003 | Comb |
| 6,578,596 B1 | 6/2003 | Batchelder et al. |
| 6,722,872 B1 * | 4/2004 | Swanson et al. ............... 425/225 |
| 6,755,238 B1 * | 6/2004 | Hirokawa ..................... 164/529 |
| 6,790,403 B1 | 9/2004 | Priedeman, Jr. et al. |
| 6,814,907 B1 | 11/2004 | Comb |
| 7,026,574 B2 | 4/2006 | Belfiore et al. |
| 7,168,935 B1 | 1/2007 | Taminger et al. |
| 7,255,825 B2 | 8/2007 | Nielsen et al. ................ 264/494 |
| 2007/0003656 A1 | 1/2007 | LaBossiere et al. |
| 2007/0228590 A1 | 10/2007 | LaBossiere et al. |
| 2009/0314391 A1 | 12/2009 | Crump et al. |

FOREIGN PATENT DOCUMENTS

| | | |
|---|---|---|
| WO | WO 9937456 | 7/1999 |
| WO | WO 0008519 | 12/2000 |

OTHER PUBLICATIONS

Cao, W.; Miyamoto, Y.: Freeform Fabrication of Aluminum Parts by Direct Deposition of Molten Aluminum. Journal of Materials Processing Technology, Elsevier, NL, vol. 173, No. 2, Apr. 10, 2006, pp. 209-212.

Finke, S.; Feenstra, F.K.: "Solid Freeform Fabrication by Extrusion and Deposition of Semi-Solid Alloys". Journal of Materials Science, Kluwer Academic Publishers, BO, vol. 37, No. 15, Aug. 1, 2002, pp. 3101-3106.

Murthy, N.S., Minor H., Akkapeddi, M.K., Van Buskirk, B., "Characterization of Polymer Blends and Alloys be Constrained Profile-Analysis of X-Ray Diffraction Scans", received Oct. 12, 1989, accepted Jan. 2, 1990, (8 pages), Journal of Applied Polymer Science, vol. 41, 2265-2272 (1990), John Wiley & Sons, Inc., USA.

Zhang, B., Zhao, D.Q., Pan M.X., Wang, W.H, Greer, A.L.., "Amorphous Metallic Plastic", Physical Review Letters, Received Feb. 26, 2005; published May 23, 2005, (4 pages) PRL 94, 205502 (2005), The American Physical Society College Park, MD, USA.

* cited by examiner

INORGANIC IONIC SUPPORT MATERIALS FOR DIGITAL MANUFACTURING SYSTEMS

CROSS-REFERENCE TO RELATED APPLICATION(S)

The present application is based on and claims priority to U.S. Provisional Patent Application No. 61/149,182, entitled "Inorganic Ionic Support Materials For Digital Manufacturing Systems", filed on Feb. 2, 2009, and the disclosure of which is incorporated by reference in its entirety.

Reference is hereby made to Crump et al., U.S. patent application Ser. No. 12/145,131, entitled "System And Method For Building Three-Dimensional Objects With Metal-Based Alloys", filed on Jun. 24, 2008, published as U.S. Patent Application Publication No. 2009/0314391, and the disclosure of which is incorporated by reference in its entirety.

BACKGROUND

The present invention relates to systems and methods for building three-dimensional (3D) models in digital manufacturing systems. In particular, the present invention relates to support materials and support structures for use in high-temperature, digital manufacturing systems.

Digital manufacturing systems are used to build 3D models from digital representations of the 3D models (e.g., STL format files) using one or more layer-based additive techniques. Examples of commercially available layer-based additive techniques include fused deposition modeling, ink jetting, selective laser sintering, electron-beam melting, and stereolithographic processes. For each of these techniques, the digital representation of the 3D model is initially sliced into multiple horizontal layers. For each sliced layer, a build path is then generated, which provides instructions for the particular digital manufacturing system to form the given layer. For deposition-based systems (e.g., fused deposition modeling and ink jetting), the build path defines the pattern for depositing roads of modeling material from a moveable deposition head to form the given layer.

For example, in a fused deposition modeling system, modeling material is extruded from a moveable extrusion head, and is deposited as a sequence of roads on a platform in a horizontal x-y plane based on the build path. The extruded modeling material fuses to previously deposited modeling material, and solidifies upon a drop in temperature. The position of the extrusion head relative to the platform is then incremented along a vertical z-axis, and the process is then repeated to form a 3D model resembling the digital representation.

In fabricating 3D models by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

A common interest of consumers in the industry of digital manufacturing is to increase the physical properties of the 3D models, such as part strengths and durability. One category of materials that could provide such increased physical properties include metal-based alloys. For example, 3D models built from high-strength metals may exhibit tensile strengths that are substantially greater than those of industrial thermoplastic materials. However, the extrusion of metal-based alloys poses several issues for digital manufacturing. For example, the extrusion of metal-based alloys requires high operating temperatures, which may undesirably affect performance of current digital manufacturing systems. Furthermore, currently available support materials are thermally unstable at such high operating temperatures, thereby effectively precluding their use to form support structures in such environments. Thus, there is an ongoing need for materials and methods for forming support structures in high-temperature digital manufacturing systems.

SUMMARY

An aspect of the disclosure is directed to a support material for use with a digital manufacturing system. The support material includes at least one inorganic ionic compound, and is configured to be deposited with the digital manufacturing system using a first layer-based additive technique to form a support structure. The support structure is configured to support at least one overhanging region of a three-dimensional model built with the digital manufacturing system using a second layer-based additive technique.

Another aspect of the disclosure is directed to a digital manufacturing system that includes a build chamber configured to be maintained at one or more elevated temperatures. The digital manufacturing system also includes a first deposition line disposed at least partially within the build chamber, and configured to deposit a heated support material using a first layer-based additive technique to build a support structure, where the support material comprises at least one inorganic ionic compound. The digital manufacturing system further includes a second deposition line disposed at least partially within the build chamber, and configured to deposit a heated modeling material using a second layer-based additive technique to build a three-dimensional model having at least one overhanging region that is supported by the support structure.

A further aspect of the disclosure is directed to a method for building a three-dimensional model with a digital manufacturing system. The method includes heating a build chamber of the digital manufacturing system, and depositing a support material into the build chamber using a first layer-based additive technique to form a support structure, where the support material comprises an inorganic ionic compound. The method also includes depositing a modeling material into the build chamber using a second layer-based additive technique to form the three-dimensional model, where the three-dimensional model comprises at least one overhanging region supported by the support structure.

DETAILED DESCRIPTION

Figure 1:
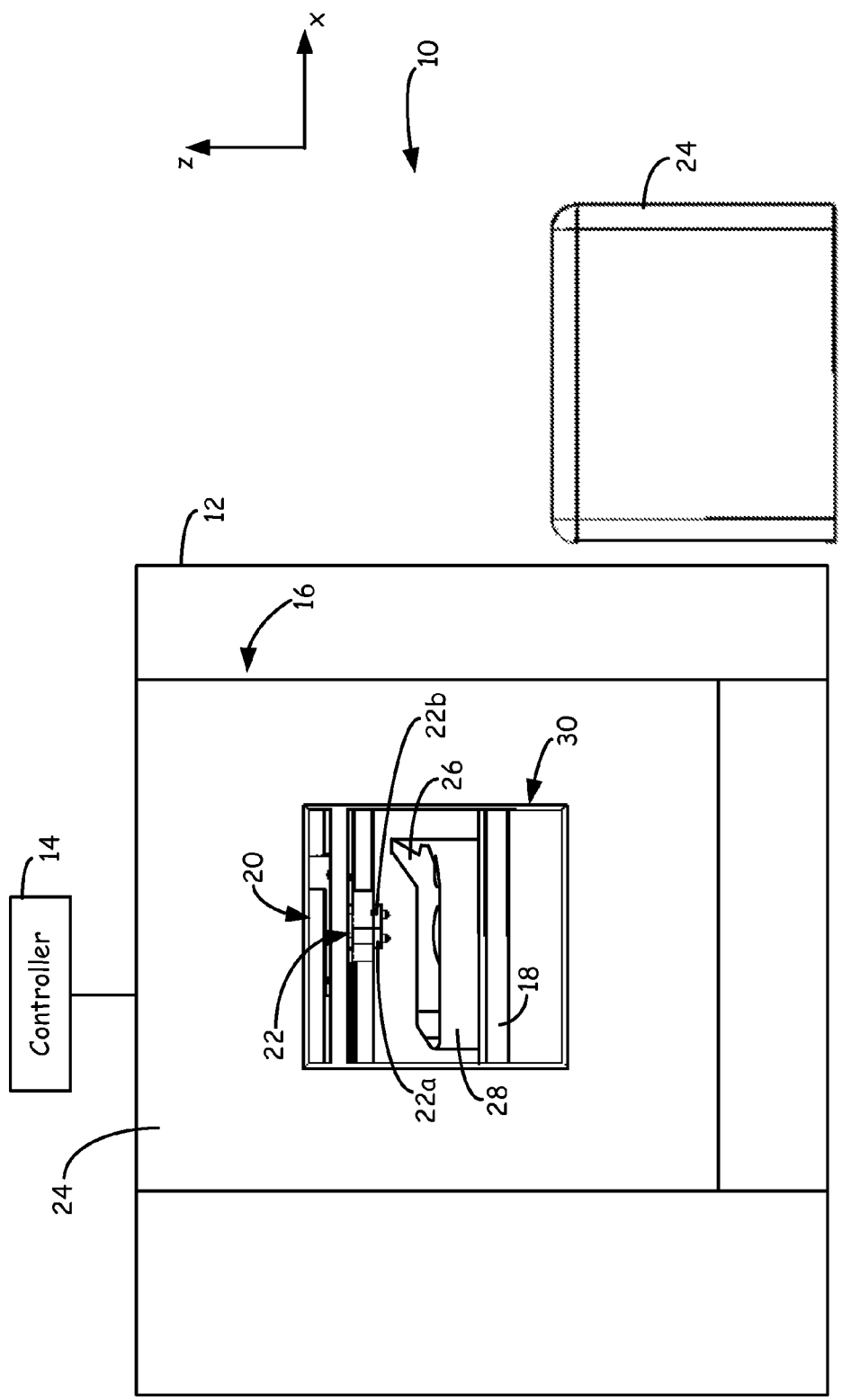
FIG. 1 is a front view of a digital manufacturing system for building 3D models and support structures in a high temperature environment.

As shown in FIG. 1, system 10 is a digital manufacturing system for building 3D models and corresponding support structures, where the support structures provide vertical and/or lateral support to overhanging regions of the 3D models during a build operation. In the embodiment shown in FIG. 1, system 10 is desirably a high-temperature, digital manufacturing system configured to build 3D models from high-temperature modeling materials, such as metals and high-temperature plastics. Examples of suitable high-temperature, digital manufacturing systems for system 10 include those disclosed in Crump et al., U.S. Patent Application Publication No. 2009/0314391.

The support structures are formed from a support material that includes one or more inorganic ionic compounds, where the support material may be melted to an extrudable or liquid state for deposition. As discussed below, suitable inorganic ionic compounds for use in the support material include inorganic salt compounds having monoatomic or polyatomic halide ions ionically bonded to metal elements. The support material is suitable for forming support structures in the high-temperature environment of system 10, and provides good adhesion to the modeling material of the 3D models. In addition to providing load-bearing support to overhanging portions of the 3D models, the support structures may also perform other functions, such as providing release mechanisms from underlying platens, providing leveling mechanisms over the platens, providing curl control structures, providing thermal sinking, and providing fluxing for interlayer attachment of the modeling material. The support material also desirably dissociates in a liquid (e.g., water), thereby rendering the support structures soluble in the liquid for removal from the built 3D models.

As shown in FIG. 1, system 10 includes housing 12, controller 14, build chamber 16, build platform 18, x-y gantry 20, deposition head 22, and tank 24. Housing 12 is the exterior housing of system 10, which protects the internal components of system 10 from external conditions. Controller 14 is a computer-operated controller that receives source geometries of the 3D models (e.g., digital models in .STL formats), and converts the received source geometries into sequences of processing steps that system 10 performs to build the 3D models and corresponding support structures. Accordingly, controller 14 provides control signals to system 10, and may be an integral component of system 10 or external to system 10.

Build chamber 16 is an enclosed, high-temperature environment in which 3D models (e.g., 3D model 26) and corresponding support structures (e.g., support structure 28) are built, where support structure 28 supports at least one overhanging region of 3D model 26. Build chamber 16 functions as a high-temperature oven, and is desirably maintained at one or more elevated temperatures to reduce the risk of mechanically distorting (e.g., curling) 3D model 26 and support structure 28, and to decrease shrinkage due to the thermal expansion coefficient of the modeling and support materials. The temperature of build chamber 16 may be elevated through the use of electrical and/or flame-based mechanisms using timed thermal ramping cycles.

Build chamber 16 includes chamber walls 24, which are the lateral, ceiling, and base walls of build chamber 16, and are desirably fabricated from one or more thermally-insulating materials capable of withstanding the elevated temperatures of build chamber 16. Suitable materials for chamber walls 24 include heat-resistant and low-thermal expansion materials, such as refractory ceramic firebricks, silica firebricks, high-temperature alloys and superalloys, and combinations thereof. Chamber walls 24 include access opening 30, which allows access within build chamber 16 before and after build operations. Access opening 30 is desirably secured with a door (not shown) during the build operations to maintain temperature uniformity within build chamber 16.

The elevated temperature of build chamber 16 desirably ranges from the solidification temperature of the modeling material to the creep relaxation temperature of the modeling material. As used herein, the term "creep relaxation temperature" of a material refers to a temperature at which the stress relaxation modulus of the material is 10% relative to the stress relaxation modulus of the material at the solidification temperature of the material, where the stress relaxation modulus is measured pursuant to ASTM E328-02. Examples of suitable elevated temperatures for build chamber 16 range from about 200° C. to about 800° C., with particularly suitable temperatures ranging from about 400° C. to about 700° C., and with even more particularly suitable temperatures ranging from about 500° C. to about 650° C.

The elevated temperature of build chamber 16 may also exhibit multiple temperature zones. For example, the temperature at the deposition site may be above the solidification temperature of the modeling material (e.g., below or about even with the creep relaxation temperature of the modeling material), while the remainder of build chamber 16 may be below the solidification temperature of the modeling material (e.g., within 20° C. below the solidification temperature of the modeling material). This prevents the temperature gradient within build chamber 16 from generating significant stresses on 3D model 26 and support structure 28 while cooling.

Furthermore, the elevated temperature within build chamber 16 may also be monitored with one or more process control loops to maintain the desired temperature(s) during the build operations. Temperature monitoring is desirable for use with metal-based modeling material. Such materials typically have high thermal conductivities, and therefore, radiate high amounts of heat when cooling from the extrusion temperatures to the temperature of build chamber 16.

Build chamber 16 may also be purged of oxygen (e.g., air) prior to a build operation, and may contain a non-oxidizing gas and/or vacuum conditions. This is beneficial for use with metal modeling materials, which may otherwise be subjected to oxidative conditions. For example, build chamber 16 may be vented to the atmosphere, and purged with an inert gas (e.g., nitrogen, helium, argon, and xenon). Additionally, build chamber 16 may be connected to a vacuum line (not shown) to reduce the pressure to vacuum conditions. Examples of suitable vacuum pressures for performing the build operation include about 13 millipascals (about $10^{-4}$ Torr) or less, with more particularly suitable pressures including about 1.3 millipascals (about $10^{-5}$ Torr) or less. The reduced pressure may also be used in combination with the inert gas. In embodiments in which inert gases are used, the atmosphere within build chamber 16 is desirably re-circulated to maintain temperature uniformity, and may be vented externally after the build operation is complete.

Build platform 18 is a substrate on which 3D model 26 and support structure 28 are built, and is movably retained within build chamber 16 by a z-axis gantry assembly (not shown)

based on signals received from controller 14. Suitable materials for build platform 32 include materials capable of use in the elevated temperature of build chamber 16, and that are compatible with the modeling and support materials. Examples of suitable materials for build platform 32 include nickel-based alloys and superalloys, graphites, ceramics, carbides (e.g., silicon carbides) and combinations thereof.

X-y gantry 20 is a gantry assembly that is configured to retain and move deposition head 22 in a horizontal x-y plane within build chamber 16 based on signals received from controller 14. In an alternative embodiment, build platform 18 may be configured to move in the horizontal x-y plane within build chamber 16, and deposition head 22 may be configured to move along the vertical z-axis. Other similar arrangements may also be used such that one or both of build platform 18 and deposition head 22 are moveable relative to each other, and such that drive motors (not shown) that operate the z-axis gantry assembly and x-y gantry 20 are disposed outside of chamber walls 24 of build chamber 16. As discussed in Crump et al., U.S. Patent Application Publication No. 2009/0314391, positioning the drive motors outside of chamber walls 24 thermally isolates the drive motors from the elevated temperature of build chamber 16. This reduces the risk of damaging the drive motors, thereby preserving their operational lives. In one embodiment, coolant gases (e.g., inert gases) are relayed to one or more locations within housing 12 (outside of chamber walls 24) to further thermally isolate the drive motors from the elevated temperature of build chamber 16.

Deposition head 22 includes at least one deposition line for depositing the modeling material (referred to as deposition line 22a) and at least one deposition line for depositing the support material (referred to as deposition line 22b). While deposition lines 22a and 22b are illustrated as being in a single deposition head 22, depositions lines 22a and 22b may alternatively be provided in separate deposition heads that may move in tandem or independently. The modeling and support materials are respectively deposited from deposition lines 22a and 22b in predetermined patterns onto build platform 18 to build 3D model 26 and support structure 28 using one or more layer-based additive techniques.

In one embodiment, 3D model 26 and support structure 28 are built with the same layer-based additive technique (e.g., both built with an extrusion technique). In this embodiment, a first layer-based additive technique used to build 3D model 26 may be the same as a second layer-based additive technique used to build support structure 28. Alternatively, 3D model 26 and support structure may be built with different layer-based additive techniques (e.g., 3D model 26 built with an extrusion technique and support structure 28 built with a jetting technique). In this embodiment, a first layer-based additive technique used to build 3D model 26 may be different from a second layer-based additive technique used to build support structure 28.

Deposition head 22 may include a variety of different devices for depositing the modeling and support materials, such as one or more extrusion assemblies, one or more freeze-valve assemblies, one or more jetting assemblies, and combinations thereof. In one embodiment, as discussed below, deposition line 22a of deposition head 22 may include an extrusion assembly or freeze-valve assembly for depositing the modeling material, and deposition line 22b of deposition head 22 may include a jetting assembly for depositing the support material.

Examples of suitable extrusion assemblies for deposition head 22 include extrusion heads disclosed in LaBossiere et al., U.S. Pat. Nos. 7,384,255 and 7,604,470; Leavitt, U.S. Pat. No. 7,625,200; and Crump et al., U.S. Patent Application Publication No. 2009/0314391; where the components are fabricated from materials suitable for use in the elevated temperature of build chamber 16. Examples of suitable freeze-valve assemblies for deposition head 22 include those disclosed in Batchelder et al., U.S. Pat. No. 6,578,596 and Crump et al., U.S. Patent Application Publication No. 2009/0314391. As discussed below, examples of suitable jetting assemblies for deposition head 22 include drop-on-demand jetting heads and continuous jetting heads.

Suitable modeling materials for building 3D model 26 include metal-based materials, high-temperature plastics, and combinations thereof. Examples of suitable metal-based materials include substantially pure metals (e.g., aluminum, tin, and lead) and metal-based alloys. Examples of suitable metal-based alloys include eutectic alloys and non-eutectic alloys, where suitable non-eutectic alloys include those disclosed in Crump et al., U.S. Patent Application Publication No. 2009/0314391, such as alloys containing two or more metal elements and that exhibit at least one semi-solid state. Examples of suitable high-temperature plastics include polymeric materials having high melting point temperatures, such as high-temperature fluorinated polymers (e.g., polytetrafluoroethylenes), polyaryletherketones, polyethylene terephthalates, poly(dimethyl-phenylene ethers), polycaprolactams, copolymers thereof, and combinations thereof.

The modeling material may be deposited in a variety of rheological states, such as extrudable states and liquid states, where the given deposition state may depend on multiple factors, such as the composition of the modeling material, the deposition conditions, and/or the environmental conditions of build chamber 16. In embodiments in which deposition line 22a is a freeze-valve assembly or jetting assembly for depositing the modeling material, the modeling material is desirably melted to a liquid state for deposition into build chamber 16. This may be accomplished by heating the modeling material to a temperature that is greater than its melting point (or liquidus) temperature.

In one embodiment in which the modeling material includes a metal-based alloy, the alloy may be a substantially eutectic alloy, which may provide a lower liquidus temperature for melting the modeling material relative to the pure metals of the alloy. In this embodiment, suitable alloys for the modeling material include substantially eutectic alloys of aluminum and silicon, which exhibit a eutectic point at about 13% by weight of silicon. Accordingly, suitable concentrations of silicon in the substantially eutectic blend range from greater than about 10% by weight to less than about 15% by weight, based on the entire weight of the metal-based alloy.

Alternatively, in embodiments in which deposition line 22a is an extrusion assembly for depositing the modeling material, the modeling material is desirably melted to an extrudable state for extrusion into build chamber 16. In these embodiments, the modeling material may include one or more non-eutectic, metal-based alloys, where the material is desirably heated to a semi-solid phase of the alloys (i.e., between the solidus and liquidus temperatures). This creates a slush-like consistency for the metal-based alloy, which provides a viscosity that is suitable for extrusion.

Examples of suitable non-eutectic, metal-based alloys include aluminum-silicon (AlSi) alloys, such as AlSi alloys including about 90% by weight to about 95% by weight aluminum, and about 5% by weight to about 10% by weight silicon. Such alloys exhibit relatively low liquidus temperatures, and have suitable ranges between their solidus and liquidus temperatures for viscosity control. Examples of suitable commercially available AlSi alloys include A356 and A357 casting alloys. In these embodiments, the metal-based alloy may be heated to a temperature in the semi-solid state of the metal-based alloy that substantially preserves the original grain structure of the pre-heated alloy upon cooling (e.g., substantially free of dendrites). As discussed in Crump et al., U.S. Patent Application Publication No. 2009/0314391, this is beneficial for preserving the physical properties of the original grain structure.

The support material used to form support structure 28 includes one or more inorganic ionic compounds. As discussed above, suitable inorganic ionic compounds for use in the support material include salt compounds having mono-atomic and/or polyatomic halide ions ionically bonded to metal elements, which desirably exhibit melting points that are suitable for deposition and formation of support structures within the high-temperature environment of system 10. The ionic compounds are also desirably inorganic for use in the high-temperature environment, where the term "inorganic" refers to a molecular structure that is substantially free of carbon atoms. Thus, the one or more inorganic ionic compounds of the support material are desirably non-polymeric materials.

In one embodiment, suitable metal elements for the inorganic ionic compound include alkali metals and alkaline earth metals. Accordingly, suitable alkali-metal salts include ionic compounds of alkali metals (i.e., lithium, sodium, potassium, rubidium, cesium, and francium) and halogen elements (i.e., fluorine, chlorine, brome, iodine, and astatine), and suitable alkaline earth-metal salts include ionic compounds of alkaline earth metals (i.e., beryllium, magnesium, calcium, strontium, barium, and radium) and halogen elements (i.e., fluorine, chlorine, brome, iodine, and astatine).

Examples of suitable alkali-metal salts include lithium chloride (LiCl), lithium bromide (LiBr), potassium chloride (KCl), potassium iodide (KI), sodium chloride (NaCl), sodium bromide (NaBr), rubidium chloride (RbCl), and combinations thereof. Examples of suitable alkaline earth-metal salts include magnesium chloride ($MgCl_2$), calcium chloride ($CaCl_2$), and combinations thereof. Suitable concentrations of the one or more inorganic ionic compounds in the support material range from about 75% by weight to 100% by weight, with particularly suitable concentrations ranging from about 85% by weight to 100% by weight, and with even more particularly suitable concentrations ranging from about 95% by weight to 100% by weight, based on an entire dry weight of the support material.

The support material may also include rheology modifiers, such as alumina, silica, kaolin, silicon zircon, and combinations thereof. In embodiments in which the support material includes rheology modifiers, examples of suitable concentrations of the rheology modifiers in the support material range from about 1% by weight to about 25% by weight, with particularly suitable concentrations ranging from about 1% by weight to about 10% by weight, based on the entire dry weight of the support material.

The support material may also be deposited in a variety of rheological states, such as extrudable states and liquid states, where the given deposition state may depend on multiple factors, such as the composition of the support material, the deposition conditions, and/or the environmental conditions of build chamber 16. In embodiments in which deposition line 22b is a freeze-valve assembly or a jetting assembly for depositing the support material, the support material is desirably melted to a liquid state for deposition into build chamber 16. This may be accomplished by heating the support material to a temperature that is greater than its melting point (or liquidus) temperature.

In one embodiment, the support material may be a substantially eutectic blend of two or more inorganic ionic compounds, which may provide a lower liquidus temperature for melting the support material. In this embodiment, suitable blends for the support material include substantially eutectic blends of lithium chloride and potassium chloride, which exhibit a eutectic point at about 46% by weight of lithium chloride. Accordingly, suitable concentrations of lithium chloride in the substantially eutectic blend range from greater than about 40% by weight to less than about 50% by weight, with particularly suitable concentrations ranging from about 43% by weight to about 48% by weight, based on the entire dry weight of the blend.

Alternatively, in embodiments in which deposition line 22b is an extrusion assembly for depositing the support material, the support material is desirably melted to an extrudable state for extrusion into build chamber 16. Since inorganic salt-based materials are typically crystalline (i.e., non-amorphous) materials, such materials readily melt to liquid states upon reaching their melting point temperatures. Thus, it is difficult to attain suitable viscosities for extrusion with pure inorganic salt-based materials. To attain an extrduable state, the support material desirably includes a blend of two or more inorganic ionic compounds such that the blend exhibits at least one semi-solid state. Suitable blends for the support material include non-eutectic blends of lithium chloride and potassium chloride.

In embodiments in which lithium chloride is the predominant inorganic ionic compound of the blend, examples of suitable concentrations of lithium chloride in the blend range from about 50% by weight to about 99% by weight, with particularly suitable concentrations ranging from about 65% by weight to about 90% by weight, based on the entire dry weight of the blend. This embodiment is beneficial for providing a support material having a solidus temperature of about 350° C., and liquidus temperatures ranging from about 375° C. to about 610° C. In addition, the lithium chloride in the support material may also function in part as a fluxing agent for the modeling material at the interfaces of 3D model 26 and support structure 28, thereby reducing oxides in the modeling material and increasing interlayer adhesion at the interfaces.

Alternatively, in embodiments in which potassium chloride is the predominant inorganic ionic compound of the blend, examples of suitable concentrations of potassium chloride in the blend range from about 60% by weight to about 99% by weight, with particularly suitable concentrations ranging from about 70% by weight to about 95% by weight, based on the entire dry weight of the blend. This embodiment is beneficial for providing a support material having a solidus temperature of about 350° C., and liquidus temperatures ranging from about 450° C. to about 770° C.

The blend composition in the support material is also desirably set to provide a creep relaxation temperature for the support material that is similar to the creep relaxation temperature exhibited by the modeling material. Examples of suitable creep relaxation temperatures for the support material include temperatures within about 30° C. of the creep relaxation temperatures for the modeling material, with particularly suitable creep relaxation temperatures for the support material including temperatures within about 20° C. of the creep relaxation temperatures for the modeling material, and with even more particularly suitable creep relaxation temperatures for the support material including temperatures within about 10° C. of the creep relaxation temperatures for the modeling material. The blend may also be sheared (e.g., with an auger head) to keep the crystallites state of the blend below desired particulate sizes.

Examples of particularly suitable combinations of modeling and support materials include the above-discussed AlSi alloys having about 90% by weight to about 95% by weight aluminum, and support materials including lithium chloride (melted to a liquid state) or blends of lithium chloride and potassium chloride. The blends of lithium chloride and potassium chloride may be eutectic or non-eutectic depending on the desired rheological state of the support material (e.g., extrudable or liquid). For example, in embodiments in which the support material is deposited from a jetting assembly, the support material is desirably a substantially eutectic blend of lithium chloride and potassium chloride.

During a build operation, build chamber 16 may be substantially purged of oxidizing gases (e.g., purging with argon and/or vacuum), and is heated to one or more elevated temperatures. Controller 14 then directs x-y gantry 20 to move deposition head 22 around within build chamber 16 in the horizontal x-y plane. Controller 14 also directs deposition head 22 to extrude the modeling and support materials onto build platform 18 in a pattern based on the movement of deposition head 22, thereby forming a layer of 3D model 26 and support structure 28. The temperature of build chamber 16 allows the deposited modeling and support materials to solidify at least to a state that is sufficient for supporting subsequently deposited modeling and support materials. Furthermore, the deposited support material sufficiently adheres to the deposited modeling material, thereby allowing the support material to support one or more overhanging regions of the deposited modeling material.

When the layer is complete, the controller 14 then directs build platform 18 to move downward along the z-axis by a single layer increment. This allows the subsequent layer of 3D model 26 and support structure 28 to be built. These steps may then be repeated until 3D model 26 and support structure 28 are completed. After the build operation is complete, the resulting 3D model 26 and support structure 28 may be stabilized to a uniform temperature prior to removal from build chamber 16, and then immersed in tank 24.

Tank 24 is a tank disposed outside of housing 12, and provides a fluid (e.g., water) for dissolving or otherwise removing support structure 28 from 3D model 26. The one or more inorganic ionic compounds of the support material desirably dissociate in the liquid, thereby allowing support structure 28 to at least partially dissolve in the liquid for removing support structure 28 from 3D model 26. In alternative embodiments, the resulting 3D model 26/support structure 28 may be sprayed or otherwise come in contact with the liquid to remove support structure 28 from 3D model 26. Suitable liquids for removing support structure 22 include any liquid capable of at least partially dissociating the one or more inorganic ionic compounds of the support material, such as water, aqueous solutions, and various solvents.

The liquid in tank 24 may also be maintained at one or more elevated temperatures to assist in the removal of support structure 28. Suitable elevated temperatures for the liquid range from about 60° C. to about 80° C. The liquid may also be agitated and/or subjected to ultrasonic frequencies. Additional examples of suitable liquids and corresponding solution baths for tank 20 include those disclosed in Priedeman et al., U.S. Patent Application Publication No. 2005/0004282.

In one embodiment, which is particularly suitable for use with metal-based modeling materials, tank 24 may also be used to quench 3D model 26 after the build operation. Thus, 3D model 26 may be quenched substantially along with the removal of support structure 28, thereby allowing the quenching and support removal to be performed in a parallel manner. The quenching process is desirably performed within a short time period after 3D model 26 is thermally stabilized to prevent lower-temperature, solid solubility changes from occurring. This preserves the desired solid solution qualities of 3D model 26. Accordingly, tank 24 is desirably located adjacent to housing 12 to allow 3D model 26 to be readily quenched after the build operation is complete. Furthermore, in this embodiment, the support material of support structure 28 is desirably capable of being readily dissolved in the liquid of tank 24 to reduce the time required for the quenching liquid to come into contact with 3D model 26. For example, support structure 28 may be built with channels that increase the surface area in which the liquid contacts the support material.

In an additional embodiment, tank 24 may be disposed in an inert gas atmosphere to further reduce the risk of oxidizing 3D model 26 during the quenching process. After the support removal and quenching process is complete, 3D model 26 may then undergo one or more post-build operations (e.g., tempering and precipitation hardening processes). As discussed below, in one embodiment, the dissolved support material may be recycled for subsequent use. The use of the above-discussed support material containing one or more inorganic ionic compounds allows support structures (e.g., support structure 28) to be built in the high-temperature environment of build chamber 16. This allows 3D models (e.g., 3D model 26) to be built from high-temperature materials, such as metals and high-temperature plastics, thereby increasing the range of materials that may be used to build 3D models with layered-based additive techniques.

Figure 2:
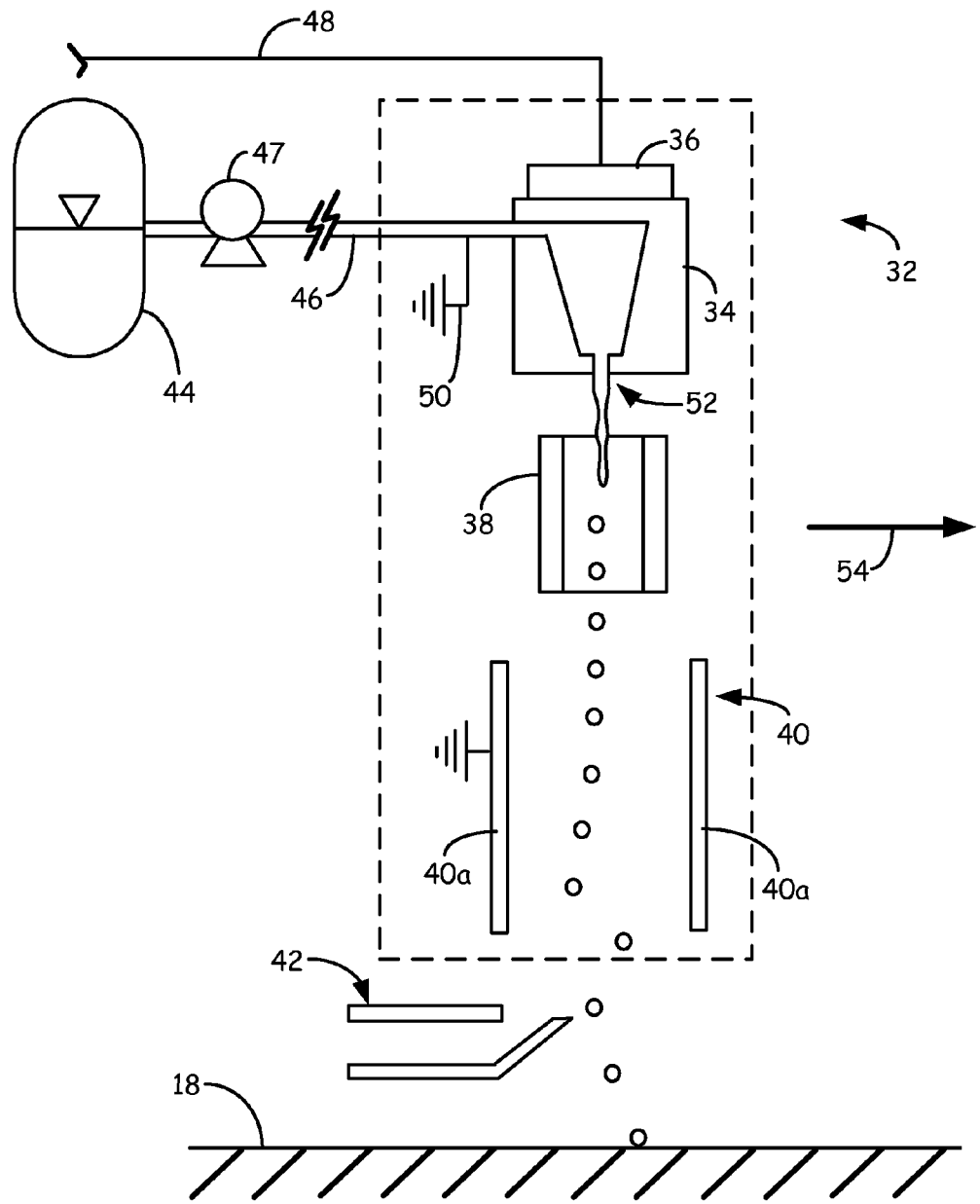
FIG. 2 is a schematic illustration of a jetting head for depositing a support material onto a build platform of the digital manufacturing system.
Figure 3:
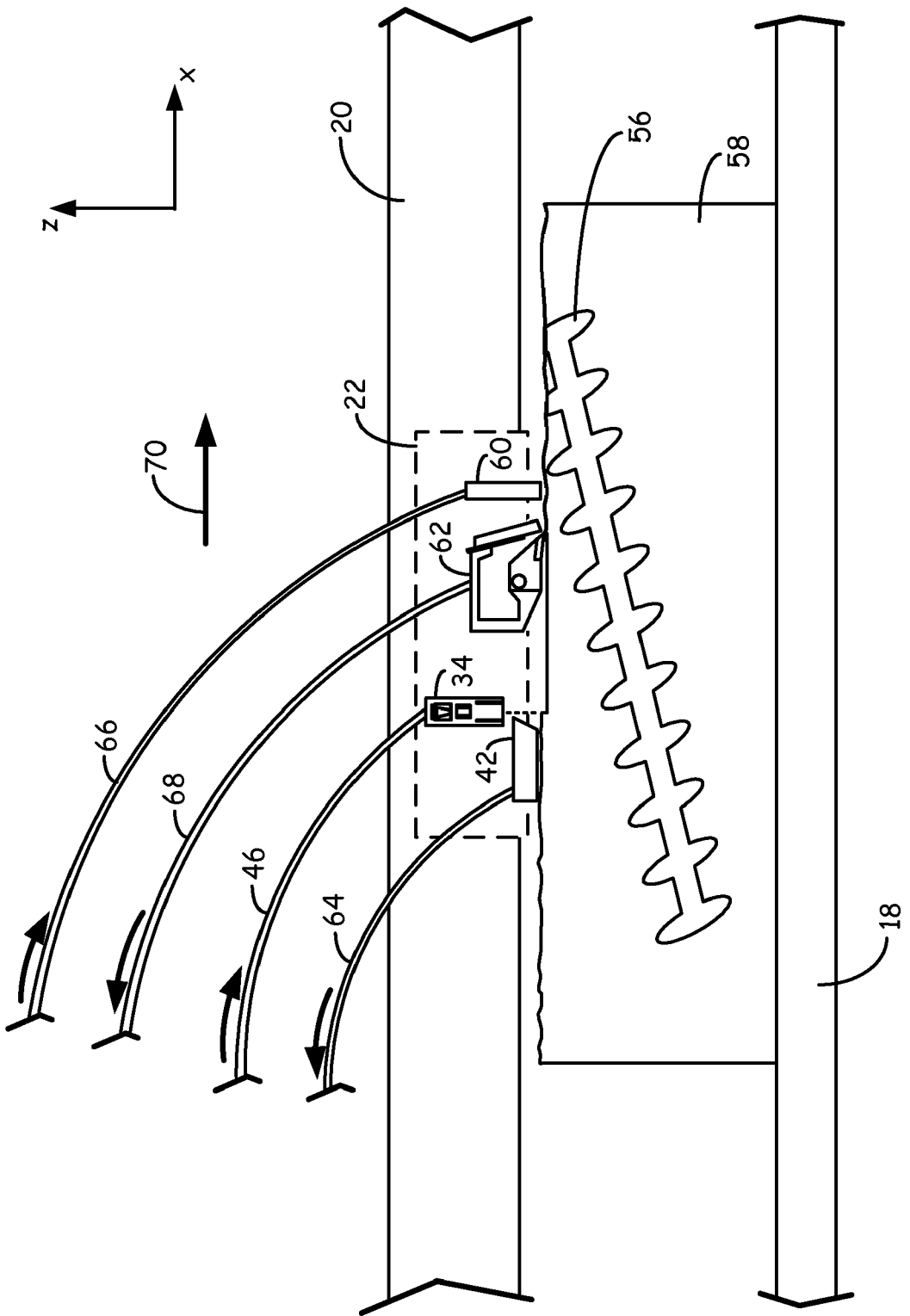
FIG. 3 is a schematic illustration of a first embodiment of the digital manufacturing system, which includes a freeze-valve assembly for depositing a modeling material and the jetting head for depositing the support material.
Figure 4:
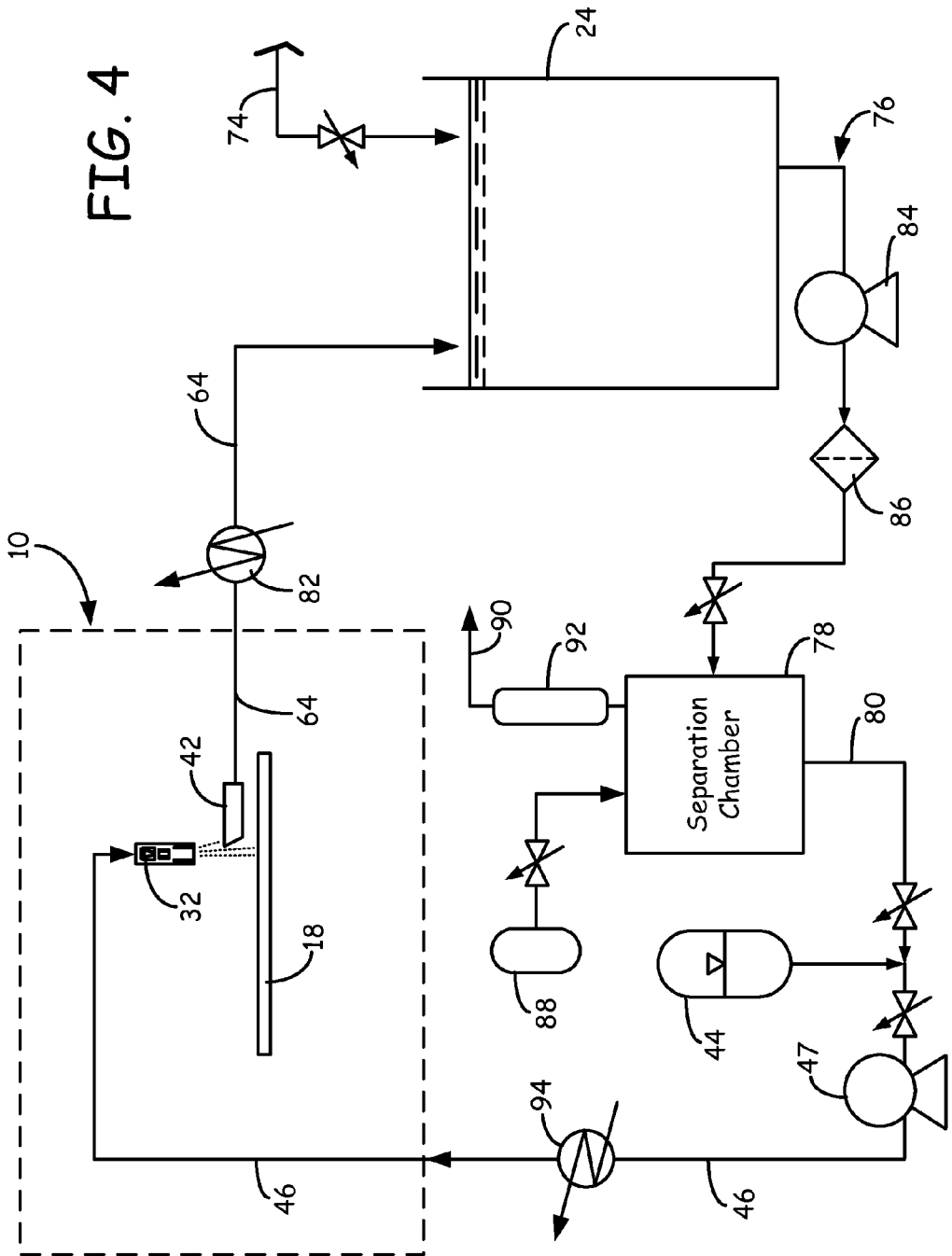
FIG. 4 is a schematic illustration of a recycling system in use with the digital manufacturing system for recycling the support material.

FIGS. 2-4 illustrate embodiments in which deposition line 22b of deposition head 22 includes a jetting head for deposing the support material in a liquid state. The viscosities of many molten inorganic ionic compounds of the support material (e.g., lithium chloride) are similar to the viscosity of water at room temperature. Thus, jetting heads are particularly suitable devices for depositing the support materials that include one or more inorganic ionic compounds. While the following discussions refer to the use of a single jetting head, deposition head 22 may include multiple jetting heads and/or jetting heads having arrays of multiple orifices for depositing the support material.

FIG. 2 is a schematic illustration of jetting head 32 in use with build platform 18, where jetting head 32 is an example of a suitable jetting assembly of deposition head 22 (shown in FIG. 1) for depositing the support material in a liquid state. Jetting head 32 is a continuous jetting head that includes gunbody 34, transducer 36, charge electrode 38, and deflection plates 40, and is in use with collection gutter 42. As shown, gunbody 34 receives a supply of the support material in the liquid state from support material source 44 via feed line 46. The molten support material may be pressurized and supplied from source 44 to gunbody 34 with fluid pump 47, where fluid pump 47 may be a conventional fluid pump capable of withstanding the elevated temperature of the molten support material. As discussed below, at source 44, the support material may initially be supplied in an aqueous solution, filtered and dried, and then heated to produce the support material in the liquid state.

Transducer 36 is desirably a piezoelectric crystal transducer that generates acoustic waves in response to electrical signals provided via conductive line 48. Suitable materials for the piezoelectric crystal transducer include any transducer material capable of withstanding the elevated temperature of build chamber 16, such as quartz transducers. Gunbody 34 is desirably grounded via a grounding line (e.g., grounding line 50) and includes orifice 52 for ejecting the molten support material based on the generated acoustic waves. The generated acoustic waves cause the support material to eject as a stream of droplets from orifice 52, and downward through charge electrode 38.

Gunbody 34 may be derived from one or more materials capable of withstanding the elevated temperature of the molten support material (e.g., stainless steel, graphites, and ceramics), and may include one or more inner-surface coatings to assist the flow of the support material and to reduce the risk of chemical attacks between the support material and the material of gunbody 34. Examples of suitable inner-surface coatings for gunbody 34 include carbide coatings, such as silicon carbides. Examples of suitable diameters for orifice 52 range from about 13 micrometers (about 0.5 mils) to about 51 micrometers (about 2.0 mils), with particularly suitable diameters ranging from about 25 micrometers (about 1.0 mil) to about 41 micrometers (about 1.6 mils).

Charge electrode 38 is desirably a tubular component through which the droplet stream of the support material passes through. Suitable materials for charge electrode 38 include any conductive material capable of withstanding the elevated temperature of build chamber 16, such as stainless steel. The location of charge electrode 38 below gunbody 34 may vary depending on a variety of operational conditions. Examples of suitable distances for charge electrode 38 below orifice 52 range from about 130 micrometers (about 5.0 mils) to about 510 micrometers (about 20.0 mils), with particularly suitable distances ranging from about 250 micrometers (about 10.0 mils) to about 380 micrometers (about 15.0 mils).

Charge electrode 38 provides a charge to the transient droplet stream to further break the droplet stream into individual droplets. Because the support material includes one or more inorganic ionic compounds, the liquid state of the support material may function as an electrolyte, which exhibits conductivity. For example, many inorganic salt-based compounds of alkali metals (e.g., lithium chloride) exhibit electrolytic properties in the molten state. Accordingly, the charge applied to droplet stream of the support material may be modified to account for this electrolytic properties of the one or more inorganic ionic compounds, where the resulting conductivity of the molten support material generally increases with decreasing size of the cations of the inorganic ionic compounds. Suitable charges applied by charge electrode 38 range from about 25 volts to about 150 volts, with particularly suitable charges ranging from about 50 volts to about 100 volts.

In an exemplary deposition process for a support material derived from lithium chloride, a suitable droplet frequency is about 100 kilohertz, which requires a pressure of less than about 100 pounds/square-inch (psi) to eject from gunbody 34, and produces droplets at about 450 inches/second (ips). For charge electrode 38 positioned about 250 micrometers (about 10.0 mils) below orifice 52, an applied charge of about 75 volts induces about 1.5-million additional electrons (i.e., about 0.25 picocoulombs) to populate a given droplet as it breaks off from the droplet stream.

Deflection plates 40 include two pairs of conductive electrodes (e.g., stainless steel plates), where the first pair (referred to as plates 40a in FIG. 2) desirably deflect or otherwise control the trajectory of the droplets along the direction movement of jetting head 32, thereby directing the droplets either toward collection gutter 42 or toward build platform 18. The second pair of conductive electrodes (not shown) are steering electrodes that desirably deflect or otherwise control the trajectory of the droplets in directions that are substantially perpendicular to the direction of movement of jetting head 32. Suitable lengths along the z-axis for plates 40a range from about 130 micrometers (about 5.0 mils) to about 250 micrometers (about 10.0 mils). Suitable lengths along the z-axis for the steering electrodes range from about 2.5 millimeters (about 0.1 inches) to about 51 millimeters (about 2 inches). These suitable lengths allow deflection plates 40 to generate an electric filed up to about ±3 kilovolts/centimeter.

For example, if the movement of jetting head 32 moves orifice 52 in a direction along the x-axis (represented by arrow 54), and the droplets are ejected from orifice 52 downward along the z-axis, plates 40a desirably deflect the droplets in directions along the x-axis, either toward collection gutter 42 or toward build platform 18. In an embodiment in which plates 40a each has a length along the z-axis of about 250 micrometers (about 10.0 mils), and in which each of the steering electrodes has a length along the z-axis of about 5.1 millimeters (about 0.2 inches), and allowing the droplets of molten support material to fall for about 76 millimeters (about 3.0 inches) outside of the deflection fields, the resulting droplets either generate a triangular wave raster across about a 2-millimeter (80-mil) wide swath along the y-axis, or are deflected about 100 micrometers (about 4 mils) into a collection gutter 42. Accordingly, allowing the droplets to build up to a 51-micrometer (2-mil) height on build platform 18, with a movement rate of jetting head 32 along the x-axis of about 110 millimeters/second (about 4.5 inches/second), provides a deposition rate of about 41 milliliters/hour (about 2.5 cubic inches/hour) and a minimum feature size attainable is about 76 micrometers (about 3.0 mils). Thus, the use of jetting head 32 allows the molten support material to be deposited at suitable deposition rates to build support structures (e.g., support structure 28 shown in FIG. 1) having fine-feature resolutions.

Collection gutter 42 is a recycling component that catches the droplets of molten support material that are deflected outside of the desired target area. As discussed below, this allows a tighter deposition variation to be maintained and allows the excess droplets to be recycled for subsequent use.

FIG. 3 is a schematic illustration of a suitable arrangement of system 10 for depositing the modeling and support materials on build platform 18 to form 3D model 56 and support structure 58. Suitable modeling and support materials for forming 3D model 56 and support structure 58 include those discussed above for 3D model 26 and support structure 28 (shown in FIG. 1). As shown in FIG. 3, deposition head 22 includes jetting head 32, collection gutter 42, freeze-valve nozzle 60, and planarizer 62, which are respectively connected to feed line 46, return line 64, feed line 66, and vacuum line 68, and each of which are supported by x-y gantry 20. In alternative embodiments, one or more of jetting head 32, collection gutter 42, freeze-valve nozzle 60, and planarizer 62 may be retained by a variety of different supports, such as cantilevered supports.

Jetting head 32 is a continuous jetting head as discussed above in FIG. 2. Alternatively, jetting head may be a variety of different drop-on-demand and continuous jetting heads for depositing the support material in the liquid state. Collection gutter is recycling component as discussed above in FIG. 2 that catches the droplets of support material that are deflected outside of the desired target area. The caught droplets may be relayed out of build chamber 16 via return line 64. Freeze-valve nozzle 62 is a deposition line for depositing the modeling material received from feed line 66 in an extrudable or liquid state. Suitable freeze-valve assemblies for freeze-valve nozzle 60 and feed line 66 include those disclosed in Batchelder et al., U.S. Pat. No. 6,578,596 and Crump et al., U.S. patent application Ser. No. 12/145,131.

Planarizer 62 is desirably a vacuum planarizer that regulates the rate of material accumulation along the z-axis. Because the modeling and support materials may melt to rheologies having low viscosities, a variety of different planarizers may be used to correct deposition rate errors in both the modeling and support materials. Accordingly, planarizer 62 desirably extends slightly below jetting head 32 and nozzle 60. This allows the deposited modeling and support materials to be planarized when they build up to a height along the z-axis equal to the height of planarizer 62. In this embodiment, one or both of jetting head 32 and nozzle 60 may be calibrated to over-deposit the respective support and modeling materials. The excess materials may then be subsequently removed by planarizer 62, and withdrawn from the build chamber 16 through vacuum line 68 for collection.

Due to the lack of moving parts within build chamber 16, the arrangement shown in FIG. 3 is beneficial for use in the high-temperature environment of build chamber 16. Feed line 46, return line 64, feed line 66, and vacuum line 68 may each include stainless-steel tubing lined with carbide or nitride coatings to reduce the risk of the modeling and support materials from collecting on the inner diameter walls of the given lines. Furthermore, feed line 46, return line 64, and feed line 66 are each desirably heated to reduce the risk of the modeling and support materials solidifying during transit.

During an exemplary build operation, build chamber 16 may be heated to a temperature of about 580° C., and a suitable modeling material of a eutectic aluminum silicon (AlSi) alloy may be heated above its liquidus temperature (e.g., heated to about 600° C.) and fed to nozzle 60 via feed line 66. Correspondingly, a suitable support material of lithium chloride may be heated above its liquidus temperature (e.g., heated to about 630° C.) and fed to jetting head 32 via feed line 46. The support material may then be deposited (i.e., jetted) with the use of jetting head 46 as discussed above. This deposits droplets of the support material onto build platform 18 to form a layer of support structure 58. The modeling material is then deposited from nozzle 60 by blocking the flow of cold gas to nozzle 60 (e.g., with an external solenoid), thereby opening the flow pathway of nozzle 60.

Each pass of the head in the direction of arrow 70 over previously deposited layers is capable of depositing a road about 51 micrometers (about 2 mils) high and about 2 millimeters (about 80 mils) wide at rate of about 110 millimeters/second (about 4.5 inches/second). The deposited modeling material overfills the trenches of the previously deposited support material, and the excess materials along the z-axis are then removed with the use of planarizer 62. The blade of planarizer 62 is desirably maintained at a temperature greater than the liquidus temperatures of the support material (e.g., about 640° C.), which allows planarizer 62 to remelt the support material for removal.

Once the layer of modeling and support materials is complete, build platform 18 is lowered by a layer increment, and the process is repeated to build each successive layer of 3D model 56 and support structure 58 using the layer-based additive technique. As discussed above, the layers of the deposited support materials provide support to the overhanging regions of the layers of modeling material. When the build operation is complete, the resulting 3D model 56/support structure 58 may be cooled, removed from build chamber 16, and placed in tank 24 for removal of support structure 58 and quenching of 3D model 56.

FIG. 4 is a schematic illustration of recycling system 72 in use with system 10, where system 10 includes jetting head 32 and collection gutter 42, as discussed above. Various components of system 10 are omitted in FIG. 4 for ease of discussion. As shown in a clockwise direction in FIG. 4, recycling system 72 includes return line 64, inlet line 74, recycle line 76, separation chamber 78, supply line 80, and feed line 46, and provides a suitable system for recycling the support material captured by collection gutter 42 and the support material dissolved and removed from the resulting 3D model in tank 24.

During a build operation, the droplets of support material captured by collection gutter 42 are relayed to tank 24 through return line 64. As discussed above, return line 64 is desirably heated (e.g., with heat exchanger 82) to reduce the risk of the support material solidifying within return line 64. Tank 24 receives the molten feed material from return line 64. The liquid in tank 24 desirably cools and dissolves the support material in the liquid, where fresh supplies of the liquid may be introduced via inlet line 74. The liquid containing the dissolved support material is drained through recycle line 76, where it is pressurized with pump 84, and fed through filter 86 to remove contaminants and agglomerates.

The resulting stream is then introduced into separation chamber 78, in which the liquid is vaporized from the support material, and the support material is melted to a liquid state. Suitable temperatures for separation chamber 78 include temperatures greater than the melting point (or liquidus) temperature of the support material. While removing the liquid from the support material a non-oxidizing atmosphere is desirable to reduce the risk of generating of oxides and hydroxides of the inorganic ionic compounds. Accordingly, separation chamber 78 may be fed an atmospheric gas (e.g., hydrogen chloride gas) from gas supply 88. The vaporized liquid and atmospheric gas may be vented from separation chamber 78 via exhaust line 90. Exhaust line 90 may include one or more scrubbing columns (e.g., column 92) to remove potentially hazardous gases from exhaust line 90, such as one or more columns filled with sodium hydroxide media.

The resulting molten support material may then be drained from separation chamber 78 through supply line 80 and combined with a fresh supply of the molten support material from supply source 44. The combined support material may then be pressurized and pumped through feed line 46 to jetting head 32 via fluid pump 47, as discussed above. Feed line 46 is desirably heated (e.g., with heat exchanger 94) to reduce the risk of the support material solidifying within feed line 46. This arrangement provides a suitable system for recycling the support material droplets caught by collection gutter 42, and suitable for use with large build operations, which may require extended periods of operation. Furthermore, after the build operation is complete, the resulting 3D model/support structure is desirably immersed in tank 24 to dissolve the support structure and quench the 3D model. As discussed above, the dissolved support structure may also be recycled in the same manner as discussed above. Accordingly, recycling system 72 is suitable for reducing the amount of support material that is discarded during and after build operations with system 10, thereby reducing material costs for the support material.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A support material that included a non-eutectic blend of 40% by weight lithium chloride and 60% by weight potassium chloride was heated to a temperature between its solidus and liquidus temperature, and then deposited onto a ceramic plate. The deposited support material was qualitatively identified to exhibit suitable rheological viscosity that for is suitable for extrusion from a high-temperature extrusion head. Upon cooling, the resulting support structure exhibited a strong structure.

The support material was also qualitatively analyzed for adhesion to an AlSi alloy modeling material that included 7% by weight silicon. The support material exhibited good adhesion to the semi-solid AlSi alloy, thereby identifying that the support material was suitable for use as a support structure for a 3D model. The support material was also readily dissolvable in water, thereby identifying that the support structure is removable from a 3D model by immersion in water. Accordingly, the lithium chloride/potassium chloride blend is suitable for functioning as a water-soluble support material for use with high-temperature modeling materials such as metal-based alloys.

Although the present disclosure has been described with reference to several embodiments, workers skilled in the art will recognize that changes may be made in form and detail without departing from the spirit and scope of the disclosure.

The invention claimed is:

1. A method for building a three-dimensional model with a digital manufacturing system, the method comprising:
   heating a build chamber of the digital manufacturing system to maintain one or more temperatures of at least about 200° C.;
   melting a support material in an extrusion head of the digital manufacturing system to an extrudable state, wherein the support material comprises a non-eutectic blend of a first inorganic alkali-metal salt and a second inorganic alkali-metal salt;
   extruding the molten support material from the extrusion head;
   depositing the extruded support material into the heated build chamber using a first layer-based additive technique to form a support structure; and
   depositing a modeling material into the heated build chamber using a second layer-based additive technique to form the three-dimensional model, wherein the three-dimensional model comprises at least one overhanging region supported by the support structure.

2. The method of claim 1, wherein the first inorganic alkali-metal salt comprises lithium chloride.

3. The method of claim 1, wherein heating the build chamber comprises heating the build chamber to maintain one or more temperatures ranging from about 400° C. to about 700° C.

4. The method of claim 1, wherein the support material has an average creep relaxation temperature that is within about 30° C. of a creep relaxation temperature of the modeling material.

5. The method of claim 1, and further comprising removing at least a portion of the support structure from the three-dimensional model by dissolving the portion of the support structure in a liquid.

6. The method of claim 1, and further comprising substantially purging the build chamber of oxidizing gases.

7. The method of claim 1, wherein the second inorganic alkali-metal salt comprises potassium chloride.

8. The method of claim 1, wherein the non-eutectic blend constitutes from about 75% by weight to 100% by weight of the support material.

9. The method of claim 1, and further comprising recycling at least a portion of the deposited support material.

10. A method for building a three-dimensional model with a digital manufacturing system, the method comprising:
    heating a build chamber of the digital manufacturing system to maintain one or more temperatures of at least about 200° C.;
    melting a support material in an extrusion head of the digital manufacturing system to an extrudable state, wherein the support material comprises a non-eutectic blend of a first alkali-metal salt and a second alkali-metal salt, and wherein the support material is substantially free of organic compounds;
    extruding the molten support material from the extrusion head;
    depositing the extruded support material into the heated build chamber using a first layer-based additive technique to form a support structure; and
    depositing a modeling material into the heated build chamber using a second layer-based additive technique to form the three-dimensional model, wherein the three-dimensional model comprises at least one overhanging region supported by the support structure.

11. The method of claim 10, wherein the first alkali-metal salt comprises lithium chloride.

12. The method of claim 10, wherein heating the build chamber comprises heating the build chamber to maintain one or more temperatures ranging from about 400° C. to about 700° C.

13. The method of claim 10, wherein the second alkali-metal salt comprises potassium chloride.

14. The method of claim 10, wherein the non-eutectic blend constitutes from about 75% by weight to 100% by weight of the support material.

15. A method for building a three-dimensional model with a digital manufacturing system, the method comprising:
    heating a build chamber of the digital manufacturing system to maintain one or more temperatures ranging from about 400° C. to about 700° C.;
    melting a support material in an extrusion head of the digital manufacturing system to an extrudable state, wherein the support material comprises a non-eutectic blend of potassium chloride and lithium chloride;
    extruding the molten support material from the extrusion head;
    depositing the extruded support material into the heated build chamber using a first layer-based additive technique to form a support structure; and
    depositing a modeling material into the heated build chamber using a second layer-based additive technique to form the three-dimensional model, wherein the three-dimensional model comprises at least one overhanging region supported by the support structure, and wherein the modeling material comprises a metal-based material.

16. The method of claim 15, wherein the potassium chloride constitutes from about 60% by weight to about 99% by weight of the non-eutectic blend.

17. The method of claim 16, wherein the potassium chloride constitutes from about 70% by weight to about 95% by weight of the non-eutectic blend.

18. The method of claim 15, wherein the metal-based material of the modeling material comprises a non-eutectic, metal-based alloy.

19. The method of claim 15, wherein the lithium chloride constitutes from about 50% to about 99% of the non-eutectic blend.

20. The method of claim 15, wherein the lithium chloride constitutes from about 65% to about 90% of the non-eutectic blend.

* * * * *